May 15, 1962 G. KIS ET AL 3,035,176
MONOSCOPIC RANGE FINDER
Filed Nov. 23, 1959 2 Sheets-Sheet 1
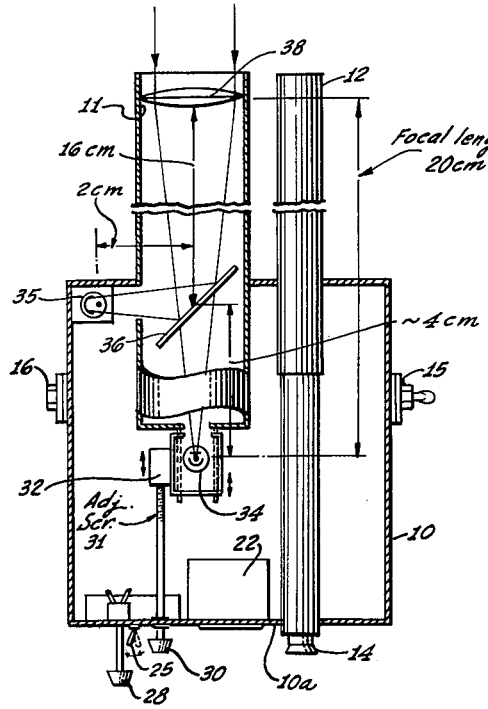
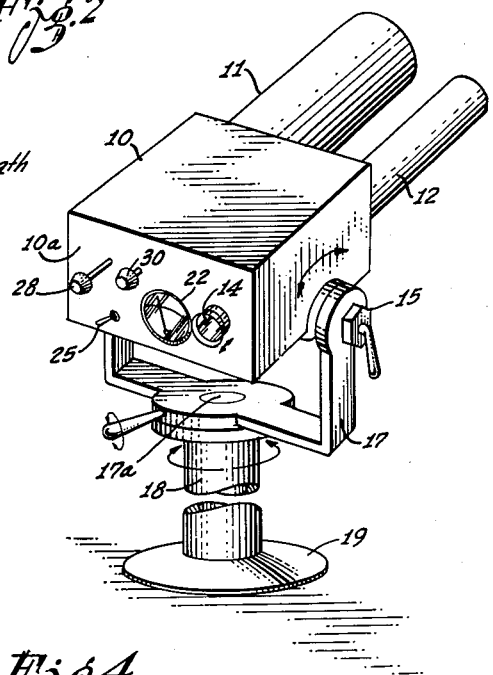
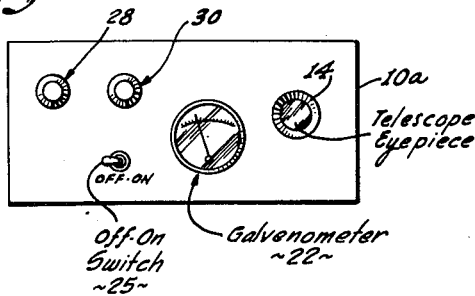
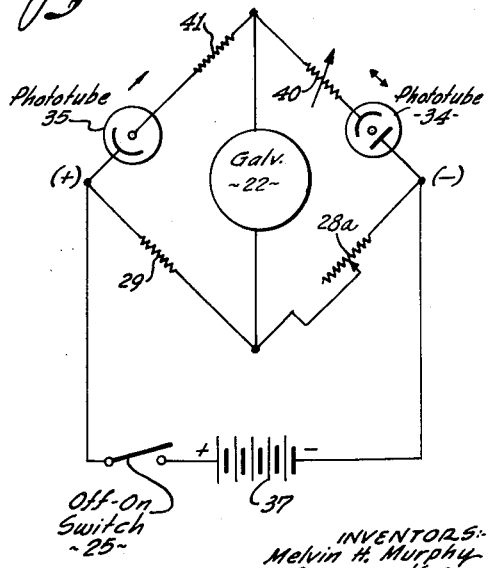
INVENTORS:
Melvin H. Murphy
George Kis
Attorneys,

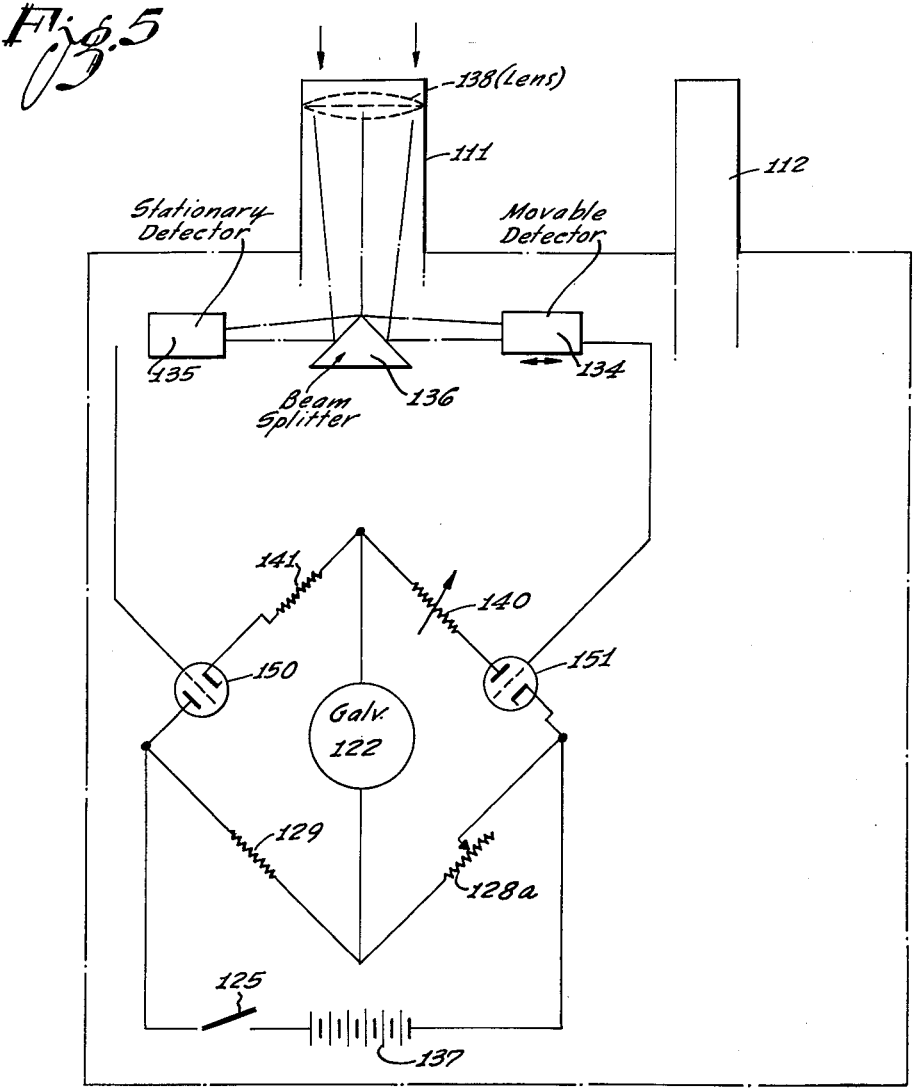
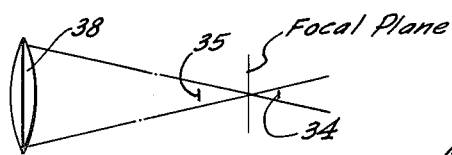

United States Patent Office 3,035,176
Patented May 15, 1962

3,035,176
MONOSCOPIC RANGE FINDER
George Kis, Santa Monica, and Melvin H. Murphy, Encino, Calif., assignors to Packard-Bell Electronics Corporation, Los Angeles, Calif., a corporation of California
Filed Nov. 23, 1959, Ser. No. 854,847
13 Claims. (Cl. 250—210)

This invention relates to apparatus for determining the range of visible objects and, more particularly, to navigation apparatus for small water craft and the like.

In general, the various heretofore successful aids to navigation utilized the reflection of radio waves or the reflection of sound waves to determine the bearing and range of an object. These aids require elaborate, bulky and expensive instruments which are impractical for installation on small water craft. The instruments, moreover, have relatively large power requirements and, therefore, often utilize the main power supply of the ship or craft. If the main power supply fails, the instrument becomes disabled just at a time when it may be most needed.

In illustrative embodiments of this invention, a navigation instrument is provided which is relatively small and compact and has relatively small power requirements. The instrument rapidly determines the range of an object, utilizing visible light from the object. The light is received through a condensing lens and directed to a beam splitting pellicle which provides two identical images of the object to two photocells. One of the photocells is stationary and the other is movable. The stationary photocell receives less illumination from the object than does the movable photocell because it is closer to the pellicle so that its light sensitive surface receives a smaller fraction of the light flux from the pellicle. The cross-sectional area of the beam at the stationary photocell is larger than the sensitive area of the photocell. The focal length of the lens is somewhat greater than the total distance from the lens to the pellicle and from the pellicle to the stationary photocell. The other photocell is movable through a small range of distances which is slightly larger than the focal range of the lens. The instrument is focused on the object by moving the movable photocell and by comparing the currents provided through the two photocells. When the movable photocell is in the image plane so that the instrument is focused the ratio of currents is at a maximum.

The ratio of currents is determined in a Wheatstone bridge arrangement which includes the two photocells and circuit adjusting means. With the instrument focused, the bridge arrangement is balanced utilizing the circuit adjusting means which is calibrated in the object range. The range accordingly may be directly read.

In another specific embodiment of this invention, the navigation instrument includes a beam splitter and two infrared radiation detection devices which function in exactly the same manner as the two photocells except that infrared radiation is utilized. An infrared mirror wedge is utilized as the beam splitter instead of a pellicle and means are provided for providing a similar amount of radiation to each of the two detection devices.

Further advantages and features of this invention will become apparent upon consideration of the following description when read in conjunction with the drawing wherein:

FIGURE 1 is a sectional view of one embodiment of the range determining apparatus of this invention in which visible light is utilized;

FIGURE 2 is a pictorial view of the one embodiment of the range determining apparatus of this invention;

FIGURE 3 is a rear view of the one embodiment of the range determining apparatus of this invention illustrating the control panel components;

FIGURE 4 is a circuit representation of the one embodiment of the range determining apparatus;

FIGURE 5 is a partially functional and partially circuit representation of a second embodiment of this invention in which infrared radiation from a target is utilized for determining its range; and FIGURE 6 is a diagrammatic representation of the optical system illustrating the principles of operation of the navigation instrument of this invention.

Referring to FIGURES 1 through 4, a navigation instrument is shown for determining the range of a visible object or target. The instrument has a rectangular housing 10 which supports a telescope or theodolite 12 and a cylindrical optical housing 11. The telescope 12, which may be conventional, extends through the rectangular housing 10 having its eyepiece 14 on a control panel 10a. The control panel 10a forms one side of the rectangular housing 10.

The housing 10, telescope 12 and optical housing 11 are rotatable as a unit about both horizontal and vertical axes. The housing 10 is pivotally supported on a U-shaped bracket 17 and rotatable with respect thereto utilizing two adjusting knobs 15 and 16 positioned at opposite sides of the housing 10. The bracket 17 and the housing 10 therewtih are rotatable about a vertical axis through the center of a hollow cylindrical column 18. The bracket 17 is affixed to a shaft 17a which fits in the column 18 and which is rotatable with respect thereto. The column 18 may be attached by a stand 19 to a boat deck or other supporting structure.

The direction and angle of elevation of the telescope 12 may in this manner readily be adjusted by an operator utilizing the knobs 15 and 16. The telescope 12 is utilized to locate the target for which the range is to be determined. With the instrument being pointed toward the target, its range may be readily determined utilizing the control panel shown particularly in FIGURE 3.

In order to determine the range of the target, an on-off switch 25 is first moved to its on position to energize the circuit depicted in FIGURE 4. The various circuit components illustrated in FIGURE 4 are supported in the rectangular housing 10. When the switch 25 is moved to its on position it closes paths for energizing two photocells 34 and 35 which form part of two arms of a Wheatstone bridge arrangement. Each of the photocells 34 and 35 may have a cadmium sulphite, 1 millimeter square surface for transforming light energy to electrical energy. The impedance presented by each of the photocells 34 and 35 depends upon the magnitude of the light flux received at its sensitive surface. The impedance range may illustratively be from 133 ohms to 133 kilohms which is a light to dark current ratio of 1000 to 1. The greater the light flux falling on the sensitive surface of the photocell, the smaller the impedance across its terminals and the larger the current through the photocell. With illustratively 20 volt potential across the photocell 35, and an illumination of 1 foot-candle, which would be average, the current through the photocell 35 may be 0.095 milliampere and the impedance presented by the photocell may be 210 kilohms.

The photocell 35 is supported in the housing 10 in a position to receive light reflected at right angles to the longitudinal axis of the optical housing 11. The light from the target passes through a positive condensing lens 38 which is supported at the front of the cylindrical housing 11. The lens 38 may be a relatively thin lens having a focal length of 20 centimeters.

The light through the lens 38 is provided to a beam splitting pellicle 36 which is a very tough elastic membrane which may be approximately 0.0005 inch thick. The pellicle 36 has a substantially similar transmission and reflection characteristic in a small range of wave lengths of visible light. For this small range, approximately 50 percent of the light through the lens 38 is reflected and approximately 50 percent is transmitted directly through the pellicle 36 when the pellicle 36 is positioned at a 45 degree angle to the longitudinal axis of the cylindrical housing 11. The reflected light from the pellicle 36 is introduced to the stationary photocell 35 and the transmitted light through the pellicle 36 is introduced to the other photocell 34 which is movable. The response of the photocells 35 and 34 is selected to match that of the pellicle 36 for a 50 percent reflection and 50 percent transmission. A peak response, for example, at 6150 angstroms may be provided. A sharp peak response provides better results when a poor contrasting target is being viewed.

With the instrument centered on the target, the range of the target can readily be determined. Light from the object or target passes through a positive lens 38 to form an image of the object at a particular distance behind the lens. This distance, which is referred to as the image distance, is determined by the focal length of the lens 38 and the distance of the object to the lens. The plane upon which the image is formed is referred to as the image plane. All the light coming from the object and passing through the lens is limited by a cone that has its base at the object. A similar cone has its base in an image plane in the instrument spaced by the image distance from the lens. The object and the image distances are conjugate and the focal length of the lens 38 determines the angle included by the two cones. The distance of the image plane to the lens 38 is, therefore, directly related to the range or object distance.

This conjugate relationship between the object and image distance is utilized in photography where the distance between the objective lens and the sensitized film is variable to form an image of objects at different distances. The image distance may be, and often is, calibrated in terms of the conjugate object distance or range. By changing the image distance, the photographic instrument is focused for a different object distance. Telescopes and binoculars utilize the same principle of focusing on objects at various distances by changing the image distance.

Mathematically the relationship between the image and object distances may be expressed as follows:

$$\frac{1}{P} = \frac{1}{f} - \frac{1}{q}$$

or $$P = \frac{fq}{q-f}$$

where P is the object distance, $f$ is the focal length of the lens 38 and $q$ is the image distance. If the image distance can readily be determined, it is therefore an indication of the range. For a lens 38 having a focal length of 20 centimeters, the image distance varies from 20.04 centimeters for a 100 meter object distance to 20.408 centimeters for a 10 meter object distance. The range of image distances is, therefore, quite small.

In order to determine the range of the object, the bridge arrangement depicted in FIGURE 4 is utilized. The two photocells 34 and 35 are part of two of the arms of the bridge arrangement. As indicated above, the two photocells have identical characteristics with the photocell 35 being stationary and the photocell 34 being movable. The photocell 34 is movable along a small portion of the longitudinal axis of the cylindrical housing 11 by a knob 30 on the control panel 10a. By rotating the knob 30, a differential screw 31 is rotated to displace the cell 34 in the direction of the optical axis.

Actually, the total travel of the photocell need be quite small covering the range of possible image distances from 20.04 centimeters to 20.408 centimeters from the lens 38 for target ranges of 100 meters to 10 meters.

The stationary photocell 35 has its sensitive surface at a distance which is less than the image distance of the largest range to be determined. For a 100 meter range, the image distance is 20.04 centimeters and the sum of the distances from the lens 38 to the face of the pellicle 36 and from the face of the pellicle 36 to the sensitive surface of the photocell 35 may be 18 centimeters. For ranges smaller than 100 meters, the image distances are larger so that the stationary photocell 35 is illuminated by a portion of the reflected image for any range less than 100 meters.

Not all of the light reflected from the pellicle 36, however, is received on the 1 millimeter square sensitive surface of the photocell 35 because it is smaller than the cross-section of the light cone at its surface. In other words, the light cone has a larger diameter at the photocell 35 than the diameter of the sensitive area of the photocell 35. This relationship is illustrated in FIGURE 6 where the sensitive surfaces of the photocells 35 and 34 are shown positioned respectively in front of and behind the focal plane. The light flux received by each of the photocells 35 and 34 is a function of the relative area of its sensitive surface to the area of the cross-section of the light cone at that position. The resistance of each of the photocells 35 and 34 is proportional to the light flux it is exposed to with the magnitude of the flux instant on the cell being proportional to the size of the relative areas.

The resistance of each photocell being a function of the relative areas, is, therefore, a function of the square of the flux density. The two photocells 34 and 35 are of identical characteristics but are placed at different distances relative to the focal point of the lens 38. The difference in the currents through the two cells 35 and 34 is proportional to the square of the image distance differences. The resistance of each cell is proportional to the ratio of light flux instant on the cell to the total flux in the light cone. The cell in the image plane 34, completely filled by the light beam, defines the slope of the image cone, and the ratio of this to the illuminated area of the other cell is a measure of the distance to the object.

As indicated above, the stationary photocell 35 is closer to the pellicle 36 than the photocell 34 at any position in its short adjustment range. In order to determine the range, the photocell 34 is moved to its position in the image plane by the knob 30. Assume, for example, that an object at 90 meters is being ranged. The resistance of the photocell 35 is greater than the resistance of the photocell 34 for any range between 100 meters and 10 meters because a smaller portion of the image is received at its sensitive surface. As illustrated in FIGURE 6, the photocell 35 is closer to the lens 38 than is the photocell 34. The portion of the image viewed by the stationary photocell 35 is proportional to the square of the ratio of its distance from the lens 38 to the distance of the movable photocell from the lens 38.

The photocell 35 and a resistor 41 form one arm of the Wheatstone bridge arrangement shown in FIGURE 4, and the photocell 34 and a rheostat 40 form a second arm of the bridge arrangement. The rheostat 40 is utilized to compensate for any difference in the characteristics of the two photocells 35 and 34. If the two photocells 35 and 34 are exactly identical, the resistance of the rheostat 40 is the same as that of the resistor 41. The other two arms of the bridge arrangement are formed by a resistor 29 and a rheostat 28a respectively. The adjustment of the rheostat 28a is controlled by a knob 28 on the control panel 10a. The galvanometer 22 has one terminal connected to the junction of the resistor 29 and rheostat 28a and its second terminal connected to the junction of the resistor 41 and the rheostat 40.

With the photocell 34 having a smaller impedance than the photocell 35, the bridge arrangement is unbalanced and current flows through the galvanometer 22. After moving the photocell 34 to its furthest position from the pellicle 36, the next step is to balance the bridge arrangement. The bridge arrangement is balanced utilizing the rheostat 28a with a balance being indicated by a zero deflection of the galvanometer 22. The position of the photocell 34 is then adjusted utilizing the knob 30. As the photocell 34 is moved forward towards the pellicle 36, the ratio of its area to the cross-sectional area of the image cone increases until it reaches unity so that its resistance decreases to a minimum when the cell is in the image plane.

As illustrated in the diagrammatic representation in FIGURE 6, the photocell 34 is positioned behind the focal plane of the object at 90 meters whereas, the photocell 35 is in front of it. As the photocell 34 is moved forward towards the focal plane, its resistance decreases until it reaches the image plane. If it is advanced further its resistance increases. As the photocell 34 is advanced, the deflection of the galvanometer 22 increases until the photocell 34 reaches the image plane. Though as illustrated in FIGURE 6 and in FIGURE 1 as well, the image cone seems to taper towards a point, it actually does not because the object being ranged is not a point source. The image on the image plane, which is at the narrowest part of the cone, has a finite area which is equal to the sensitive area of the photocell 34. The longitudinal position of the photocell 34 which provides for a maximum galvanometer deflection is a discrete position because all the light flux in the cone is received at the image plane.

The adjustment of the photocell 34 to the image plane effectively focuses the navigation instrument on the object being ranged. After the instrument is focused, the rheostat 28a is adjusted by the knob 28 to again balance the bridge arrangement. With the bridge arrangement balanced, the setting of the rheostat 28a is an indication of the range of the object. The reason for this indication will be apparent from a consideration of the following relationships. The relationship of the impedances of the various components in the bridge arrangement may be represented by the equation $$\frac{R35+R41}{R34+R40} = \frac{R29}{R28a}$$

when the bridge arrangement is balanced, with the impedance for each component being indicated by its reference designation preceded by the letter R. By rearranging the terms, the resistance of the rheostat 28a equals $$\frac{(R29)(R34+R40)}{(R35+R41)}$$

The resistances R41 and R40 are quite small compared to the resistances R35 and R34 and if the two photocells 34 and 35 are identical may be omitted. By removing R41 and R40 from the equation, $$R28a = (R29)\left(\frac{R34}{R35}\right)$$

The resistance R29 is a constant so that the rheostat setting depends upon the ratio of the photocell resistances, or $$R28a \sim \frac{R34}{R35}$$

As described above, the ratio of the photocell resistances is proportional to the distances to the two photocells 35 and 34. If D35 is the distance to the photocell 35 and D34 is the distance to the photocell 34, then $$R28a \sim \frac{R34}{R35} \sim \frac{D35}{D34}$$

But the distance D35 is a constant because the photocell 35 is stationary so that the rheostat setting depends upon the image distance D34. The larger the image distance D34, the smaller the resistance R28a. With the instrument focused and the photocell 34 in the image plane, its image distance is an accurate measure of the object distance or range. Actually, as indicated above, the image distance of the focused instrument varies inversely with the object distance so that $$R28a \sim \frac{1}{D34} \sim \text{object distance}$$

or the rheostat resistance R28a is directly proportional to the object distance. The rheostat knob 30 may then be directly calibrated to provide an indication of the range when the instrument is focused and the bridge is balanced.

In order to compensate for differences in photocell characteristics, non-uniformity of temperature coefficients, etc., a calibration procedure is desirable. The compensation shall be done under the actual environmental conditions existing at the time of the particular ranging. For this purpose a "calibrate" position of the movable photocell 34 is provided. This may be in the form of a stop that will limit its travel in an extreme position, such as the focal plane of the lens 38. The theoretical resistance ratio of the fixed photocell 35 to that of the movable photocell 34 in the "calibrate" position, may be calculated, and provided in a "calibrate" position of the dial 28. Non-uniform photocell characteristics will cause a deflection of the galvanometer from zero and compensation may be done by the adjustment of rheostat 40 till the galvanometer indicates bridge balance, without changing the calibration of the dial 28.

In the embodiment described in reference to FIGURES 1 through 4 and 6, visible light from the object is utilized to determine its range. In the embodiment shown in FIGURE 5, infrared radiation is utilized instead of visible radiation to determine the range of the object so that the instrument is effective at night or in fog. It is well known that all matter radiates infrared radiation at some wave length whenever its surrounding medium is cooler. Objects above water will generally be warmer than the surrounding water even after nightfall because of the retained heat of the sun. It is this natural or retained infrared radiation that is detected by the instrument illustrated in FIGURE 5.

Infrared radiation can be reflected, focused and controlled in the beam pattern even though it is invisible because it behaves very much like visible light. The term infrared radiation is utilized to identify electromagnetic radiation having wave lengths longer than deep red in the visible spectrum at 7,800 angstrom units and up to 1,500,000 angstrom units in the microwave spectrum. Some particular known bands or windows of infrared radiation have a relatively small transmission loss through the atmosphere, and the various components of the instrument depicted in FIGURE 5 are selected to be sensitive to one such band of radiation. One of these windows, for example, exists from 3 to 4 microns wave lengths or 30,000 to 40,000 angstrom units.

The infrared radiation from the target is received at an infrared transparent condensing lens 138. The various components in FIGURE 5 which perform similar functions to corresponding components in FIGURES 1 through 4 have been given similar reference designations with the addition of 100. The lens 138 in FIGURE 5, for example, corresponds to the lens 38 in FIGURES 1 through 4. The radiation transmitted through the lens 138 is provided in the housing 111 to a mirror wedge-type beam splitter 136. The two sides of the beam splitter 136 which receive the infrared radiation are highly reflective to such radiation. The surfaces, for example, may be made of gold which is highly reflective to infrared radiation and which also attenuates visible radiation. The focal length of the lens 138 may be 20 centimeters with the beam splitter 136 being positioned approximately sixteen centimeters from the lens 138.

The configuration of the navigation instrument shown schematically in FIGURE 5 may be somewhat similar to that depicted in FIGURES 1 through 3 except that both of the radiation detectors 134 and 135 are positioned at right angles from the axis of the lens 138 instead of just one. The reason for using a wedge shape beam splitter 136 instead of a pellicle for the infrared radiation is because suitable pellicles have not been devised for the infrared radiation.

The detectors 134 and 135 are directionally responsive to the infrared radiation and may have sensitive surfaces having an area of 1 millimeter square. The detectors 134 and 135 are devices for producing a current which is proportional to the infrared radiant energy detected thereby in a manner quite similar to that of a photoelectric cell which converts visible radiation to an electric current. The detecting surface of each of the detectors or cells 134 and 135 is sensitive only to a narrow band of the infrared spectrum. Only a small band of the infrared radiation is utilized because, as indicated above, atmosphere selectively attenuates the infrared radiation transmitted through it. When lead telluride or silver caesium is utilized, the cells 134 and 135 are sensitive to radiation having a wave length between 3 and 4 microns. The lens 138, the beam splitter 136 and the detectors 134 and 135 in this manner are all highly sensitive to wave lengths between 3 and 4 microns.

The detector 135 is stationary and the detector 134 is movable with the two detectors 135 and 134 performing essentially the same functions as the photocells 34 and 35 in FIGURE 1. The detectors 134 and 135, however, are not themselves included as part of the bridge arrangement but control triodes 150 and 151 which are included in the bridge arrangement. When the on-off switch 125 is closed, the battery 137 energizes the bridge arrangement with the impedance through the two triodes 150 and 151 being determined respectively by the magnitude of the infrared radiation received at their associated detectors 135 and 134. The greater the magnitude of the received infrared radiation, the smaller the impedance through the associated triode and the larger the current through it. The resistors 141 and 129, the rheostats 140 and 128a and the galvanometer 122 perform the same functions as their corresponding components in FIGURE 4.

In the visible light embodiment shown in FIGURES 1 through 4, identical images are provided to the two photocells 35 and 34. In the infrared embodiment shown in FIGURE 5, however, with a wedge shape beam splitter 136 being utilized, identical images are not provided to the two detectors 135 and 134. One side, or one-half, of the received image is coupled to the detector 135 from one reflective surface of the beam splitter 136 and the other side, or half, of the received image is coupled from the other reflective surface of the beam splitter 136 to the movable detector 134. To locate the object or target, the telescope 112 is utilized. The telescope 112 may be sensitive to infrared radiation having a converter therein, not shown, for converting the received infrared radiation to light. The operator can in this manner effectively see an image of the received infrared radiation. With the instrument pointed toward the object which is to be ranged, it may be centered on the object utilizing the galvanometer 122. The fine adjustment for centering of the instrument is accomplished by moving the detector 134 to a position at a distance from the associated reflective surface of the beam splitter 136 which is equal to the distance from the stationary detector 135 to its associated reflective surface on the beam splitter 136. The movable detector 134 is movable over a larger range of distances than is the photocell 34 in FIGURE 1 to provide for such an adjustment.

With the two detectors 134 and 135 positioned at the same distance from the focal plane, the rheostat 128a is adjusted to provide for the exact same resistance as the resistor 129. By then moving the instrument, the magnitude of the infrared radiation received at the two detectors 134 and 135 is varied. When the magnitude of the infrared radiation is exactly the same at the two detectors 134 and 135, the galvanometer 122 indicated in a bridge balance. With the bridge balanced, the instrument is centered on the object and both detectors 134 and 135 are receiving the same amount of infrared radiation flux.

To determine the range of the object, a similar procedure is performed by the operator as described above in reference to the visible light embodiment shown in FIGURES 1 through 4. The detector 134 is moved to provide a maximum reading on the galvanometer 122 and then the bridge is balanced utilizing the rheostat 128a to determine the range of the object. The rheostat 128a is calibrated with the range so that a direct reading thereof may be provided.

Although this application has been disclosed and illustrated with reference to particular applications, the principles involved are susceptible of numerous other applications which will be apparent to persons skilled in the art. The invention is, therefore, to be limited only as indicated by the scope of the appended claims.

What is claimed is:

1. A navigation instrument for determining the range of an object, including, a condensing lens for receiving light from the object, a beam splitter positioned in the path of the light from said lens for providing two identical images of the object, a stationary photocell having a sensitive surface positioned at a predetermined distance from said beam splitter for receiving a portion of one of the two identical images provided from said beam splitter, a photocell movable toward and away from said beam splitter for receiving a portion of the second one of the two identical images provided by said beam splitter with the portion of the image of the object received therefrom varying as it is moved, and a circuit arrangement including said stationary photocell and said movable photocell for determining the ratio of the distances of said photocells to said beam splitter when said movable photocell is positioned in the image plane for the object being ranged.

2. A navigation instrument for determining the distance of a visible object within a particular range of distances from the instrument, a condensing lens having a particular focal length and through which light from the visible object is transmitted, a beam splitter for providing two substantially identical beams, said beam splitter being positioned in the path of the light transmitted through said lens and at a distance from said lens which is less than the focal length of the lens, a first photocell which is stationary with respect to said beam splitter having a light sensitive surface positioned in the path of one of the two substantially identical beams from said beam splitter, the area of said light sensitive surface being smaller than the cross-sectional area of said one substantially identical beam at said light sensitive surface for light through said lens from visible objects in the particular range of distances, a second photocell movable toward and away from said beam splitter having a light sensitive surface positioned in the path of the second one of the two substantially identical beams from said beam splitter, the area of said light sensitive surface being smaller than the cross-sectional area of said second beam at said light sensitive surface of said second photocell for light through said lens from visible objects in the particular range of distances for every position of said second photocell, except when it is positioned in the image plane, and circuit means coupled to said first photocell and to said second photocell for determining the ratio of the portion of said one beam on said sensitive surface of said first photocell to that of said second beam on said sensitive surface of said second photocell.

3. A navigation instrument for determining the range of an object, including, a condensing lens for receiving light from the object, a beam splitter positioned in the path of the light from said lens for providing two identical images of the object, a stationary photocell having a sensitive surface positioned at a predetermined distance from said beam splitter for receiving a portion of one of the two identical images provided from said beam splitter, a photocell movable toward and away from said beam splitter for receiving a portion of the second one of the two identical images provided by said beam splitter with the portion of the image of the object received therefrom varying as it is moved, and circuit means coupled to said stationary photocell and to said movable photocell for determining the ratio of the resistance of said stationary photocell to the resistance of said movable photocell for every position of said movable photocell including for the position of said movable photocell in the image plane of the object being ranged.

4. A navigation instrument for determining the distance of a visible object within a particular range of distances from the instrument, a condensing lens having a particular focal length and through which light from the visible object is transmitted, a beam splitter for providing two substantially identical beams, said beam splitter being positioned in the path of the light transmitted through said lens and at a distance from said lens which is less than the focal length of the lens, a first photocell which is stationary with respect to said beam splitter having a light sensitive surface positioned in the path of one of the two substantially identical beams from said beam splitter, the area of said light sensitive surface being smaller than the cross-sectional area of said one substantially identical beam at said light sensitive surface for light through said lens from visible objects in the particular range of distances, the sum of the distances from said lens to said beam splitter and from said beam splitter to said sensitive surface of said first photocell being less than the focal length of said lens, a second photocell movable toward and away from said beam splitter having a light sensitive surface positioned in the path of the second one of the two substantially identical beams from said beam splitter, the area of said light sensitive surface being smaller than the cross-sectional area of said second beam at said light sensitive surface of said second photocell for light through said lens from visible objects in the particular range of distances for every position of said second photocell, except when it is positioned in the image plane, the sum of the distances from said lens to said beam splitter and from said beam splitter to said sensitive surface of said second photocell for any position of said second photocell being greater than the sum of the distances from said lens to said beam splitter and from said beam splitter to said sensitive surface of said first photocell, and circuit means coupled to said first photocell and to said second photocell for determining the ratio of the light fluxes received at the sensitive surfaces.

5. A navigation instrument for determining the range of an object emitting radiation, a condensing lens through which some of the radiation is transmitted having a particular focal length, a first and a second radiation responsive device providing an electrical signal in accordance with the radiation received thereat, said first and said second radiation responsive devices being positioned at different distances from said lens in the path of the radiation transmitted through said lens, said second radiation responsive device being movable toward and away from said lens to vary the electric signal provided thereby, and circuit means coupled to said first and to said second radiation responsive devices for determining when said second radiation responsive device is in the image plane of the object.

6. A navigation instrument in accordance with claim 5, including, in addition, a beam splitter positioned in the path of the radiation from said lens to said first and said second radiation responsive devices for providing a separate similar beam of radiation to each of said first and said second devices.

7. A navigation instrument in accordance with claim 5 wherein said determining includes a bridge circuit arrangement having a first arm including said first radiation responsive device, a second arm including said second radiation responsive device, a third arm including an impedance, a fourth arm including an adjustable impedance for balancing the bridge circuit arrangement to provide an indication of the range, and a meter coupled from the junction of said first and said second arms to the junction of said third and said fourth arm for determining when said second radiation responsive device is in the image plane of the object and also when the bridge circuit arrangement is balanced by said adjustable impedance.

8. A navigation instrument in accordance with claim 6 wherein said beam splitter is a wedge shaped mirrored surface device, and wherein said instrument includes in addition, means coupled to said two devices for determining when the amount of radiation received at each of said first and said second devices is equal to a predetermined ratio.

9. A navigation instrument for determining the range of an object, including, an optical system including a radiation condensing device for developing two substantially identical images of the object, two radiation detecting devices positioned at different distances from said condensing device, one of said detecting devices receiving at least some of the radiation forming one of the two images of the object, the second one of said detecting devices receiving at least some of the radiation forming the second one of the two images of the object, and circuit means coupled to said two radiation detecting devices for determining the ratio of the amount of radiation received at said one detecting device to the amount of radiation received at said second radiation detecting device.

10. A navigation instrument in accordance with claim 9 wherein at least one of said two radiation detecting devices is movable toward and away from said condensing device.

11. A navigation instrument for determining the range of an object emitting radiation, a condesing lens through which some of the radiation is transmitted having a particular focal length, a first and a second radiation responsive device providing an electrical signal in accordance with the radiation received thereat, said first and said second radiation responsive devices being positioned at different distances from said lens in the path of the radiation transmitted through said lens, said second radiation responsive device being movable toward and away from said lens to vary the electric signal provided thereby, and circuit means coupled to said first and to said second radiation responsive devices for determining when said second radiation responsive device is in the focal plane of the object, and for determining the ratio of the signals provided by said first and said second radiation responsive devices when said second radiation responsive device is in the image plane of the object.

12. An instrument for determining the range of an object, including, optical means for collecting light reflected by the object and for forming an image of the object, a beam splitter positioned in the path of the light from the optical means for providing along two paths two identical images of the object, two photocells, each having a sensitive surface positioned in a different one of the two paths from the beam splitter but at different distances from the planes where the images are formed, the two photocells intercepting identical light cones at different distances from their respective apexes so that their illumination is also different, the difference in illumination being proportional to the distance from the target object and to the ratio of the cross section areas of the light cones at the point of interception, and electronic means for sensing and measuring the difference of photocell resistance and converting the resistance distance into range information.

13. A navigation instrument for determining the distance of a visible object within a particular range of distances from the instrument, a condensing lens having a particular focal length and through which light from the visible object is transmitted, a beam splitter for providing two substantially identical beams, said beam splitter being positioned in the path of the light transmitted through said lens and at a distance from said lens which is less than the focal length of the lens, a first photocell having a light sensitive surface positioned in the path of one of the two substantially identical beams from said beam splitter, the area of said light sensitive surface being smaller than the cross-sectional area of said one substantially identical beam at said light sensitive surface for light through said lens from visible objects in the particular range of distances, a second photocell having a light sensitive surface positioned in the path of the second one of the two substantially identical beams from said beam splitter, the area of said light sensitive surface of said second photocell being smaller than the cross-sectional area of said second beam at said light sensitive surface of said second photocell for light through said lens from visible objects in the particular range of distances, and circuit means coupled to said first photocell and to said second photocell for determining the ratio of the portion of said one beam on said sensitive surface of said first photocell to that of said second beam on said second sensitive surface of said second photocell.

References Cited in the file of this patent

UNITED STATES PATENTS 2,703,505    Senn _____ Mar. 8, 1955